(12) United States Patent
Zhu et al.

(10) Patent No.: US 9,087,316 B2
(45) Date of Patent: Jul. 21, 2015

(54) COMPARTMENT STORAGE CONTAINER WITH ELECTRONICALLY ADDRESSABLE COMPARTMENTS

(71) Applicants: Shengbo Zhu, San Jose, CA (US); Su Shiong Huang, Bellevue, WA (US)

(72) Inventors: Shengbo Zhu, San Jose, CA (US); Su Shiong Huang, Bellevue, WA (US)

(73) Assignee: Microdata Corporation, San Jose, CA (US)

( * ) Notice: Subject to any disclaimer, the term of this patent is extended or adjusted under 35 U.S.C. 154(b) by 203 days.

(21) Appl. No.: 13/815,106

(22) Filed: Jan. 31, 2013

(65) Prior Publication Data

US 2014/0210594 A1    Jul. 31, 2014

(51) Int. Cl.
| | |
|---|---|
| *G08B 5/22* | (2006.01) |
| *G06Q 10/08* | (2012.01) |
| *B25H 3/02* | (2006.01) |
| *A47F 10/00* | (2006.01) |
| *A47B 88/20* | (2006.01) |

(52) U.S. Cl.
CPC ............. *G06Q 10/087* (2013.01); *A47F 10/00* (2013.01); *B25H 3/022* (2013.01); *A47B 88/20* (2013.01)

(58) Field of Classification Search
None
See application file for complete search history.

(56) References Cited

U.S. PATENT DOCUMENTS

| | | | |
|---|---|---|---|
| 6,392,543 B2 * | 5/2002 | Maloney | 340/568.1 |
| 7,654,388 B2 * | 2/2010 | Catron | 206/1.5 |
| 2012/0001758 A1 * | 1/2012 | Zhu et al. | 340/572.8 |

* cited by examiner

*Primary Examiner* — Steven Lim
*Assistant Examiner* — Omeed Alizada (57) ABSTRACT

A compartment storage container for use in a collective objects management system with remote location of compartments containing sought objects. Each compartment has an address decoder with a unique address electrically connected to an electrical input connector which supplies compartment search signals to the container. Each compartment has an LED indicator which is activated when a compartment search signal specifies a compartment address which matches the address of an address decoder in the container. Each container has an electrical output connector which can be connected to the electrical input connector of another container so that several containers can be connected to one another. Each container can be removably installed in a cabinet drawer and electrically connected to conductive support rails in the drawer to communicate with a cabinet based collective objects management system.

19 Claims, 6 Drawing Sheets

COMPARTMENT STORAGE CONTAINER WITH ELECTRONICALLY ADDRESSABLE COMPARTMENTS

BACKGROUND OF THE INVENTION

This invention relates to collective objects management in general, and in particular to a storage container having electronically addressable storage compartments.

The term "collective objects management systems" is a term coined to denote systems for generally keeping track of items ("objects") in a collection of items. For example, an automobile parts warehouse at any given time has a collection of vehicle parts ("objects") in inventory. The kind and number of such parts varies every day, as parts are sold and new parts are received. In order to keep track of the number and kind of vehicle parts in inventory, some type of collective vehicle parts management system must be used. Similarly, in a semiconductor manufacturing operation, at any given time there is a collection of integrated circuits ("objects") of one or more types located somewhere in the facility, which must be accounted for using a collective integrated circuits management system. Hardware stores and the hardware department of large home improvement stores typically have large collections of relatively small objects, such as fasteners (e.g., nuts, bolts, washers, sheet metal screws, and wood screws); grommets of various sizes; O-rings; electrical connectors; and small electronic components, such as diodes, resistors, and capacitors. Such object collections ideally need a collective objects management system to maintain a current inventory.

In all of the above examples, compartment storage containers have been used to house the objects. A typical compartment storage container has a number of partitions, either permanent or removable, to create a number of individual compartments in which the objects can be placed on a sorted basis. Such compartment storage containers have been fabricated from both metal and plastic, with some such containers using metal for both the container housing and the container partitions, others using plastic for both the container housing and the partitions, still others using a plastic container housing and metal partitions, and others using a metal container housing and plastic partitions. The plastic materials used in the past have been either opaque or translucent.

Compartment storage containers are found in homes, work shops, hardware stores, automotive parts stores and manufacturing facilities and have proven to be useful in a wide variety of applications requiring the organized storage of small items for ready access.

A principal difficulty encountered with the use of compartment storage containers lies in the manner of retrieving desired items from the collection of items stored in the several compartments in a given container. In particular, retrieving the correct item requires identifying the contents of individual compartments until the correct compartment containing the desired item is found. In some applications, visual inspection, either directly or through a transparent top cover, is the technique relied upon to identify the types of articles contained in that compartment. In other applications, small labels are adhered to the interior of each compartment, with each label containing a brief description of the type of object contained in that compartment. Both techniques are less than optimal. The visual inspection technique divulges only a minimum of subjective information about the contained objects. Similarly, the label technique is limited by the amount of space available on the label to describe the objects contained in that compartment. Depending on the nature of the contained objects, the label technique cannot adequately distinguish the articles in one compartment from the articles in other compartments. For example, if the objects contained in different compartments of a given container are resistors of different resistance values and power ratings, it is at best difficult to adequately distinguish among the several choices presented by all of the compartments in the same container. Similarly, if the objects contained in different compartments of a given container are threaded bolts of different pitch, thread fineness and length, it is likewise at best difficult to adequately distinguish among the several choices presented. The label technique also suffers from the disadvantage that the labels must be changed whenever the kinds of objects contained in a given compartment are changed. Both techniques are relatively inefficient in enabling quick identification of the correct compartment in applications having large collections of different types of objects. In general, the larger the number of containers and compartments, the slower the access time to the contents of the desired compartment.

SUMMARY OF THE INVENTION

The invention comprises a compartment storage container which incorporates an electronically searchable technique for enabling identification of the compartment storage container and the compartment in that container containing a sought object.

From an apparatus standpoint, the invention comprises a compartment storage container for enabling remote location and retrieval of objects located in the container, the container comprising a base wall, a plurality of upstanding wall members connected to the base wall, the base wall and the plurality of upstanding wall members defining an enclosure volume, a plurality of upstanding partition members located within the enclosure volume and defining a plurality of compartments for receiving objects, a plurality of address decoders each positioned in a different one of the plurality of compartments and each having a unique address, an electrical input connector secured to one of the upstanding wall members and ohmically coupled to the plurality of address decoders for providing compartment search signals supplied by a source to the plurality of address decoders, and a plurality of light sources, preferably LEDs, each electrically coupled to a different one of the plurality of address decoders and activatable thereby whenever one of the compartment search signals specifies an address matching the address of the associated one of the plurality of address decoders.

A container light source, preferably an LED, is mounted to one of the wall members of the compartment storage container in a location visible from the exterior of the container, the light source being ohmically connected to the electrical input connector and activatable whenever a compartment search signal specifies an address matching the unique address of one of the address decoders in that container.

An electrical output connector is secured to one of the upstanding wall members and is ohmically coupled to the electrical input connector for manifesting the compartment search signals supplied by the source so that the compartment search signals can be coupled to an electrical input connector located in another compartment storage container coupled to the electrical output connector.

The base wall of the container preferably has an upper surface; and each of the plurality of address decoders is preferably secured to this upper surface.

The container further may include a cover, preferably transparent, so as to render visible the compartment LEDs. The cover may be a separate element or a cover member which is attached to one of the upstanding wall members of the container in a hinged arrangement.

The invention may further include first and second electrically conductive handles each secured to a different one of the upstanding wall members and electrically coupled to the plurality of address decoders so that compartment search signals coupled to at least one of the handles are supplied to the plurality of address decoders when the container is received in a cabinet drawer having conductive support rails electrically coupled to a collective objects management system.

From a system standpoint the invention comprises an array of compartment storage containers for enabling remote location and retrieval of objects located in the containers, the array comprising a plurality of compartment storage containers each having a base wall, a plurality of upstanding wall members connected to the base wall, the base wall and the plurality of upstanding wall members defining an enclosure volume, a plurality of upstanding partition members located within the enclosure volume and defining a plurality of compartments for receiving objects, a plurality of address decoders each positioned in a different one of the plurality of compartments and each having a unique address, an electrical input connector secured to one of the upstanding wall members and ohmically coupled to the plurality of address decoders for providing compartment search signals to the plurality of address decoders, an electrical output connector secured to one of the upstanding wall members and ohmically coupled to the electrical input connector, and a plurality of light sources, preferably LEDs, each electrically coupled to a different one of the plurality of address decoders and activatable thereby whenever one of the compartment search signals specifies an address matching the address of the associated one of the plurality of address decoders, the output connector of some of the compartment storage containers being coupled to the input connectors of other ones of the compartment storage containers to form an electrically intercoupled array; and a controller having an output coupled to the input connector of one of the plurality of compartment storage containers for providing compartment search signals supplied by a source to the plurality of address decoders, the compartment search signals being coupled to all of the compartment storage containers in the electrically intercoupled array so that the compartment search signals are coupled to all of the plurality of address decoders in any of the compartment storage containers in the intercoupled array. Preferably, all of the plurality of compartment storage containers are electrically intercoupled.

The controller preferably includes a compartment address encoder for converting compartment search signals received from a source, such as a host computer, to compartment address signals, each compartment address signal being unique to a given address decoder.

Each of the plurality of compartment storage containers preferably includes a container light source, preferably an LED, mounted to one of the wall members in a location visible from the exterior of the container, the light source being ohmically connected to the electrical input connector and activatable whenever a compartment search signal specifies a compartment address matching the address of an address decoder located in that container.

The base wall of each container preferably has an upper surface, and each of the plurality of address decoders is preferably secured to this upper surface.

Each container may include a cover, preferably transparent so as to render visible the compartment LEDs. The cover may be a separate element or a cover member which is attached to one of the upstanding wall members of the container in a hinged arrangement.

Each of the compartment storage containers may further include first and second electrically conductive handles each secured to a different one of the upstanding wall members and electrically coupled to the plurality of address decoders so that compartment search signals coupled to at least one of the handles are supplied to the plurality of address decoders. This alternate embodiment renders the invention compatible with drawer-based collective objects management systems For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
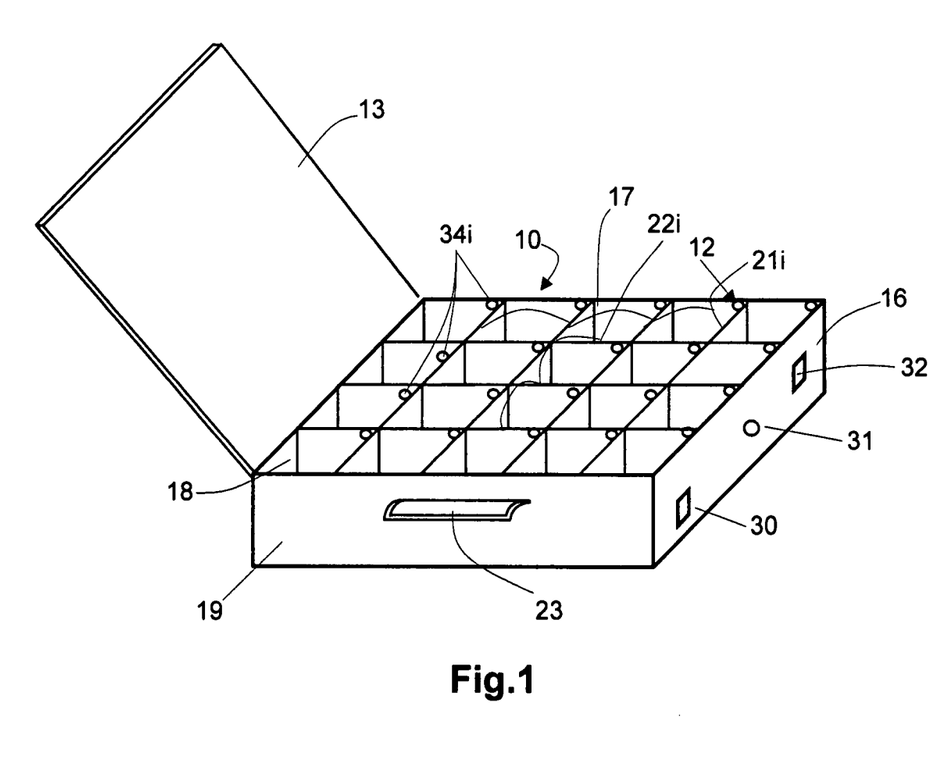
FIG. 1 is a perspective view of a compartment storage container according to the invention.

Turning now to the drawings, FIG. 1 is a perspective view of a compartment storage container according to the invention. As seen in this Fig., a compartment storage container generally designated with reference numeral 10 has a main body portion 12 and a top cover 13 illustrated as a cover member hinged at the rear margin thereof to main body portion 12. Main body portion 12 and top cover 13 are preferably fabricated from transparent molded plastic to render the contents of compartment storage container visible from the outside. Main body portion 12 is preferably a rectangular body having a bottom wall 15 (shown in FIG. 3) and four upstanding walls 16-19 forming the peripheral enclosure volume for container 10. Located within the peripheral enclosure volume are a number of vertically oriented partitions 21$i$ extending between front wall 16 and rear wall 18, and a number of vertically oriented partitions 22$i$ extending between side walls 17, 19. Partitions 21$i$, 22$i$ together define a number of individual storage compartments within main body portion 12. A pair of handles 23, 24 (see FIGS. 2 and 3) is affixed to side walls 19, 17 to facilitate hand carrying of compartment storage container 10. Handles 23, 24 are preferably fabricated from an electrically conductive material, for the purpose described below.

Figure 2:
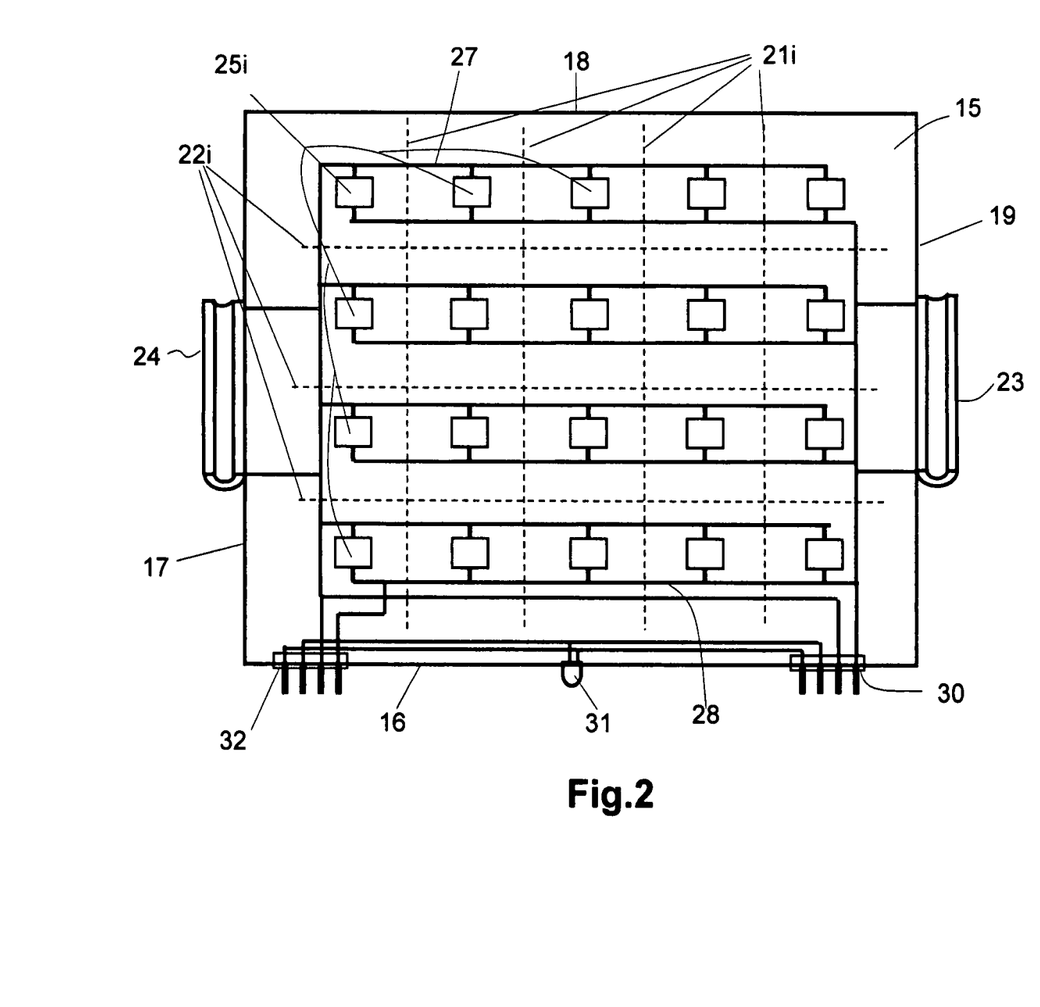
FIG. 2 is bottom plan view of the compartment storage container of FIG. 1.

With reference to FIG. 2, which is a bottom plan view of the compartment storage container 10 of FIG. 1, each compartment defined by partitions 21$i$, 22$i$ is provided with an associated address decoder 25$i$ secured to the upper surface of bottom wall 15 at locations within the associated compartment. Each address decoder 25$i$ has a unique address which serves to define that compartment. Each address decoder is preferably a type PT2272 unit available from Princeton Technology Corporation of Taipei, Taiwan. Each address decoder 25i has a pair of electrical terminals, one of which is electrically connected to a first bus conductor 27 and the other being connected to a second bus conductor 28. Bus conductors 27, 28 are connected to a pair of terminals forming part of an input connector 30 secured to front wall 16 of main body portion 12. Also connected to input connector 30 is a light source 31, preferably an LED. Input connector 30 is preferably a standard USB connector. An output connector 32, also preferably a standard USB connector, is also secured to front wall 16 of main body portion 12 and is electrically connected to bus conductors 27, 28 for a purpose described below.

Figure 3:
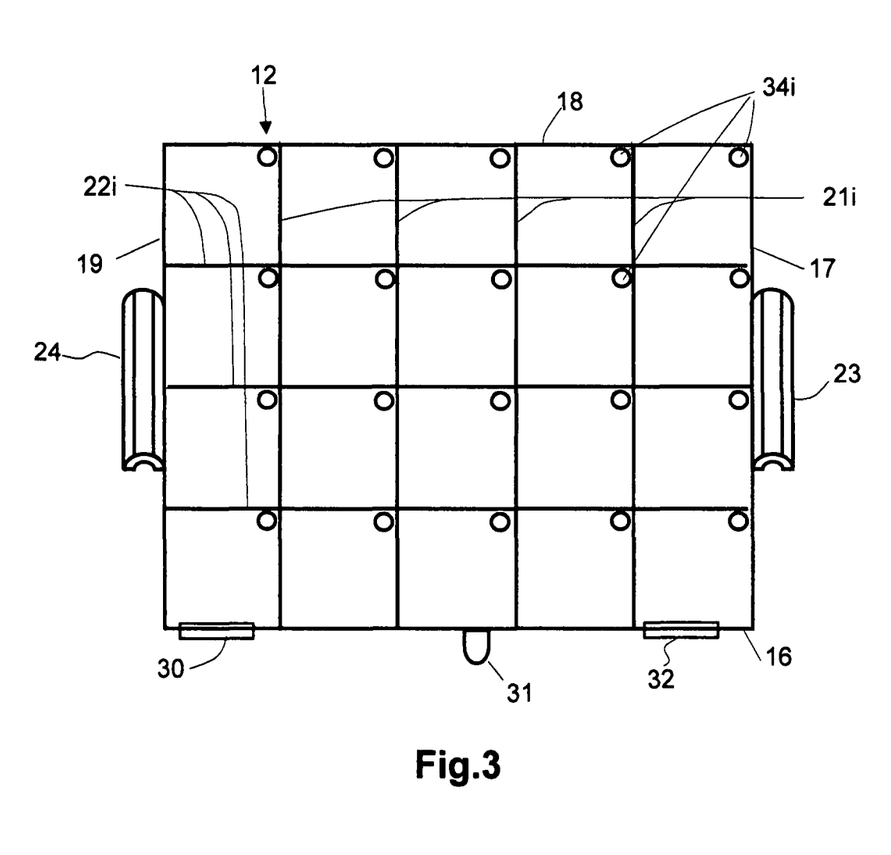
FIG. 3 is a top plan view of the compartment storage container of FIG. 1 with the top cover removed.

As illustrated in FIGS. 1 and 3, each compartment is provided with a light source 34i, preferably an LED, which is electrically coupled to the associated address decoder 25i. When an address decoder 25i receives an input signal specifying a matching address, the associated LED 34i is illuminated to enable visual identification of the compartment specified by the address signal.

This system implements in modified form the system shown and described in commonly assigned co-pending U.S. patent application Ser. No. 12/802,645, filed Jun. 12, 2010 for "Collective Objects Management System With Object Identification Using Addressable Decoder Units"", the disclosure of which is hereby incorporated by reference. The system disclosed in the '645 U.S. patent application uses addressable decoder units to maintain control of all file folders in a collection housed in filing cabinets. Each file folder has an associated addressable decoder unit with a unique address in the file folder management system which responds to the receipt of that unique address from a source. The source is a local encoder in the file cabinet containing the addressed file, which generates the unique address in response to the receipt of a file folder identification signal from a remote host computer. Each file folder also has an indicator coupled to the decoder unit for identifying the file to a human operator. The indicator is preferably a visible indicator—such as an LED—coupled to the file folder in a convenient location which can readily be seen by a human operator when a file drawer is opened. Alternatively, an audible indicator—such as a buzzer—can be used.

The system of the present invention uses addressable decoders 25i to uniquely identify the individual storage compartments in each compartment storage container 10. Each address decoder 25i includes circuitry for generating a VALID signal whenever that address decoder detects an address signal present on one of the bus conductors 27, 28 and representative of the unique system address of that address decoder 25i. The address signals are generated by a controller 45 (shown in FIG. 4), which comprises a microcomputer such as a type AT89C2051 unit available from Intel Corporation of Santa Clara, Calif. and an address encoder such as a type PT2262 unit available from Princeton Technology Corporation of Taipei, Taiwan. Controller 45 is electrically coupled to bus conductors 27, 28 via input connector 30. A host computer (not illustrated) provided with wi-fi capability communicates with controller 45, which is also provided with wi-fi-capability. Alternatively, the host computer and controller 45 may be hard wired together, when desired. The host computer generates storage compartment identification signals which are communicated to controller 45. Controller 45 converts these storage compartment identification signals to compartment address signals, which are coupled to all of the storage compartment address decoders 25i in compartment storage container 10. When an address decoder 25i receives an input signal specifying a matching address, the associated LED 34i is illuminated to enable visual identification of the compartment specified by the address signal. In addition, light source 31 of the compartment storage container 10 is illuminated to enable visual identification of the compartment storage container 10 in which the specified compartment is located.

Figure 4:
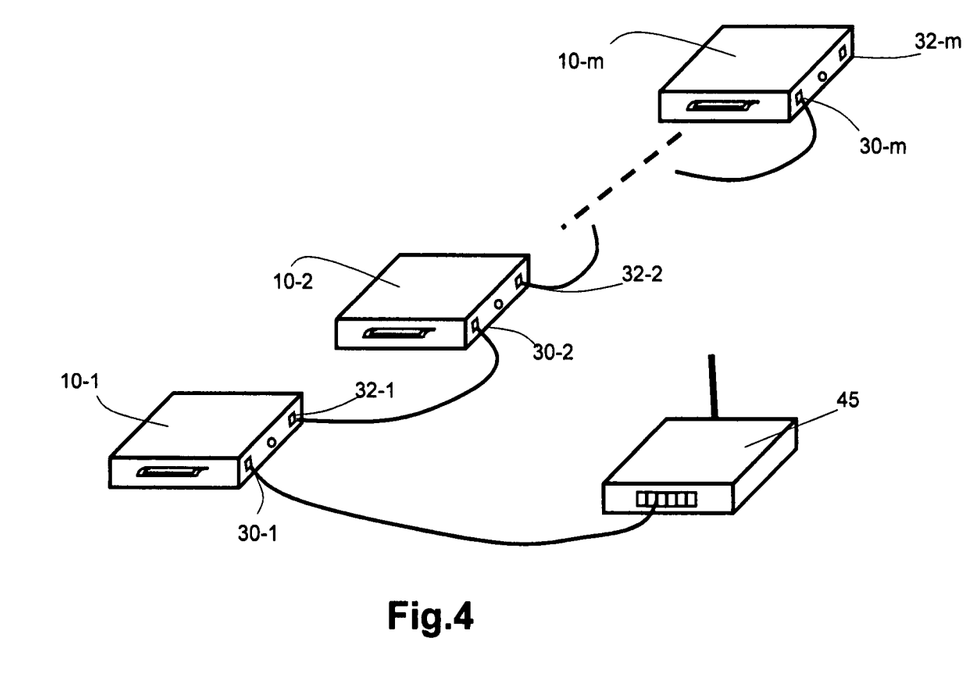
FIG. 4 is a schematic diagram illustrating several compartment storage containers electrically interconnected with a controller.

FIG. 4 is a schematic perspective view illustrating the manner in which a plurality of compartment storage containers 10i can be electrically interconnected and controlled by a single controller 45. As seen in this Fig., a plurality of compartment storage containers 10-1, 10-2, . . . , 10-n are arranged to form an array of compartment storage containers 10i. Controller 45 is electrically interfaced with a first storage container 10-1 by a single connector cable which is electrically coupled at one end to an interface connector of controller 45 and at the other end to the input connector 30-1 of compartment storage container 10-1. The output connector 32-1 of compartment storage container 10-1 is electrically coupled to the input connector 30-2 of a second one 10-2 of compartment storage containers 10i. The output connector 32-2 of compartment storage container 10-2 is electrically coupled to the input connector of a third one of compartment storage containers 10i, etc., so that all compartment storage containers 10i are electrically cascaded and controlled by controller 45. As presently implemented, controller 45 is capable of controlling up to eight compartment storage containers 10i in the cascaded arrangement illustrated.

Figure 5:
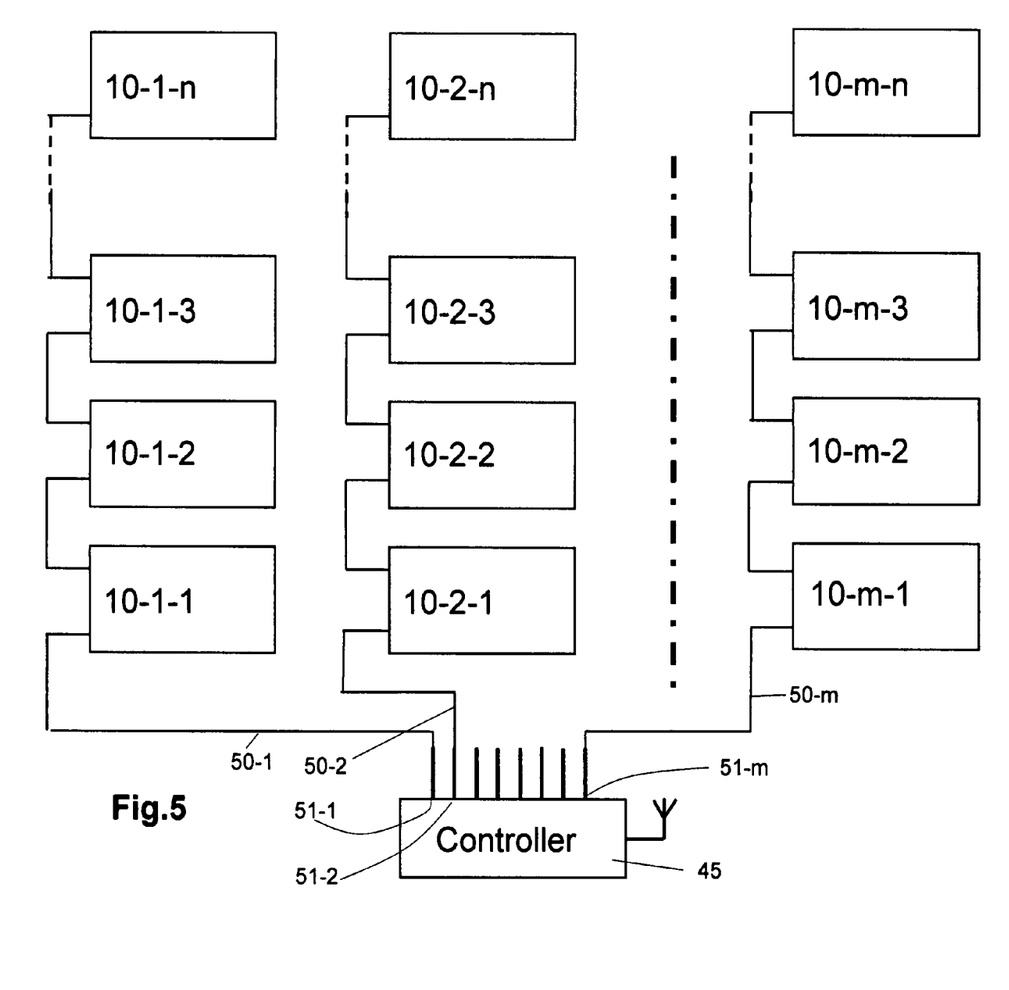
FIG. 5 is a schematic block diagram illustrating several banks of interconnected compartment storage containers connected to a single controller.

Although FIG. 4 illustrates a controller 45 having a single interface connector, as presently implemented and as illustrated in FIG. 5 (which is a schematic block diagram illustrating the connections between a single controller 45 and a plurality of arrays of individual compartment storage containers 10i) controller 45 is provided with a plurality (eight in the preferred embodiment) of interface connectors 51-1, 51-2, . . . , 51m. Each interface connector 51i is electrically coupled to the first compartment storage container 10i in an associated collection of up to eight storage containers 10i. Thus, interface connector 51-1 is coupled via connector cable 50-1 to the input connector of compartment storage container 10-1-1, interface connector 51-2 is coupled via connector cable 50-2 to the input connector of compartment storage container 10-2-1; . . . , and interface connector 51-m is coupled via connector cable 50-m to the input connector of compartment storage container 10-m-1.

Figure 6:
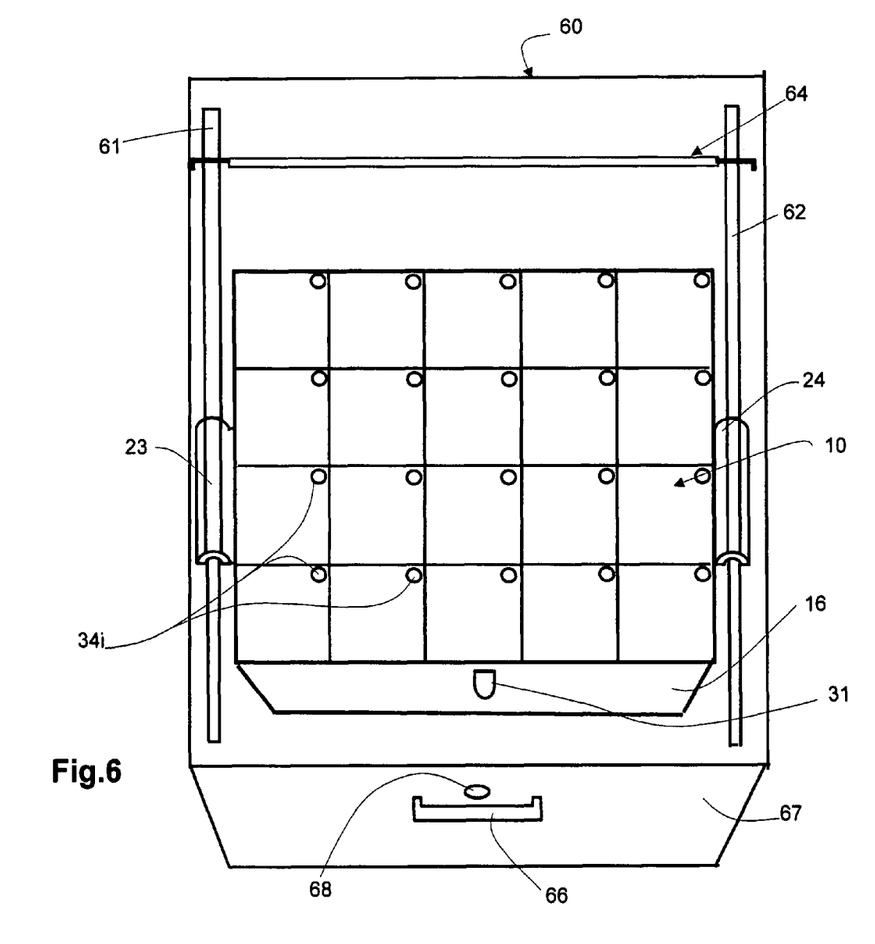
FIG. 6 is a schematic top view of the compartment storage container of FIG. 1 installed in a cabinet drawer.

FIG. 6 is a schematic top plan view illustrating the compartment storage container of FIG. 1 installed in a cabinet drawer. As seen in this Fig., a standard file cabinet drawer 60 modified in accordance with the teachings of the above-referenced '645 U.S. patent application to afford electronically searchable file and document management has a pair of electrically conductive support rails 61, 62 extending forward and aft of drawer 60 for providing physical support and electrical connections to a removable file folder 64. Drawer 60 has a handle 66 secured to a front panel 67 for facilitating movement of drawer 60 between a closed position and an open position. A drawer LED 68 is mounted to front panel 67, LED 68 being illuminated whenever a sought file folder is located in drawer 60.

Situated within the confines of drawer 60 is a compartment storage container 10. Each handle 23, 24 is supported by one of the drawer support rails 61, 62. Thus, as viewed in FIG. 6, handle 23 is supported by support rail 61, while handle 24 is supported by support rail 62. Since handles 23, 24 are electrically conductive, any compartment within compartment storage container 10 can be accessed by the system by signals presented to electrically conductive rails 61, 62. Thus, the compartment storage container 10 can be used as a standalone device or a multiple-array device in combination with a controller 45, or with a cabinet-based collective objects management system.

Storage containers fabricated according to the teachings of the invention extend the advantages of computer based collective objects management systems to easily portable and storable compartment storage containers. These advantages are as follows. Firstly, any object located in any compartment storage container can be readily located by entering the object identification into the host computer and initiating a search. If an object is part of the system inventory, the compartment storage container LED 31 will be illuminated indicating the compartment storage container in which the sought object is located. When the individual compartments of that compartment storage container are viewed (e.g., by opening the cover for that compartment storage container or looking through a transparent cover), the compartment LED 34 of the sought object will be illuminated. In addition, old objects no longer part of the system inventory can be deleted from the host computer and new objects can be added to the system inventory by entering the object identification information into the host computer. Also, the object identification information for any compartment in any compartment storage container can be easily changed. Moreover, the necessity for individual compartment labels is eliminated.

Although the above provides a full and complete disclosure of the preferred embodiments of the invention, various modifications, alternate constructions and equivalents will occur to those skilled in the art. For example, handles having different shapes than those illustrated for handles 23, 24 may be employed, if desired. Also, a separate removable cover can be used with the main body housing, if desired. In addition, if appropriate no cover may be provided. Therefore, the above should not be construed as limiting the invention, which is defined by the appended claims.

What is claimed is:

1. A compartment storage container for enabling remote location and retrieval of objects located in compartments in the container, said container comprising:
   a base wall;
   a plurality of upstanding wall members connected to said base wall, said base wall and said plurality of upstanding wall members defining an enclosure volume, said plurality of upstanding wall members including a front wall member, a rear wall member, a first side wall member, and a second side wall member;
   a plurality of upstanding partition members located within said enclosure volume and defining a plurality of compartments for receiving objects, said plurality of upstanding partition members including a first sub-plurality of upstanding partition members extending between said front wall member and said rear wall member, and a second sub-plurality of upstanding partition members extending between said first side wall member and said second side wall member;
   a plurality of address decoders each positioned in a different one of said plurality of compartments and each having a unique address;
   an electrical input connector secured to one of said upstanding wall members and ohmically coupled to said plurality of address decoders for providing compartment search signals supplied by a source to said plurality of address decoders; and
   a plurality of light sources each electrically coupled to a different one of said plurality of address decoders and activatable thereby whenever one of said compartment search signals specifies an address matching the address of the associated one of said plurality of address decoders.

2. The invention of claim 1 further including a container light source mounted to one of said wall members in a location visible from the exterior of said container, said light source being ohmically connected to said electrical input connector.

3. The invention of claim 1 further including an electrical output connector secured to one of said upstanding wall members and ohmically coupled to said electrical input connector for manifesting said compartment search signals supplied by the source so that said compartment search signals can be coupled to an electrical input connector located in another compartment storage container and coupled to said electrical output connector.

4. The invention of claim 1 wherein said base wall has an upper surface; and wherein each of said plurality of address decoders is secured to said upper surface.

5. The invention of claim 1 wherein said container includes a cover.

6. The invention of claim 5 wherein said cover is transparent.

7. The invention of claim 5 wherein said cover is attached to one of said upstanding wall members.

8. An array of compartment storage containers for enabling remote location and retrieval of objects located in the containers, said array comprising:
   a plurality of compartment storage containers each having a base wall, a plurality of upstanding wall members connected to said base wall, said base wall and said plurality of upstanding wall members defining an enclosure volume, a plurality of upstanding partition members located within said enclosure volume and defining a plurality of compartments for receiving objects, a plurality of address decoders each positioned in a different one of said plurality of compartments and each having a unique address, an electrical input connector secured to one of said upstanding wall members and ohmically coupled to said plurality of address decoders for providing compartment search signals to said plurality of address decoders, an electrical output connector secured to one of the upstanding wall members and ohmically coupled to the electrical input connector, and a plurality of light sources each electrically coupled to a different one of said plurality of address decoders and activatable thereby whenever one of said compartment search signals specifies an address matching the address of the associated one of said plurality of address decoders, the output connector of some of said compartment storage containers being coupled to the input connectors of other ones of said compartment storage containers to form an electrically intercoupled array; and
   a controller having an output coupled to the input connector of one of said plurality of compartment storage containers for providing compartment search signals supplied by a source to said plurality of address decoders, said compartment search signals being coupled to all of said compartment storage containers in said electrically intercoupled array so that said compartment search signals are coupled to all of said plurality of address decoders in any of said compartment storage containers in said intercoupled array.

9. The invention of claim 8 wherein all of said plurality of compartment storage containers are electrically intercoupled.

10. The invention of claim 8 wherein said controller includes a compartment address encoder for converting compartment search signals received from a source to compartment address signals, each compartment address signal being unique to a given address decoder.

11. The invention of claim 8 wherein each of said plurality of compartment storage containers includes a container light source mounted to one of said wall members in a location visible from the exterior of said container, said light source being ohmically connected to said electrical input connector.

12. The invention of claim 11 wherein each of said container light sources is an LED.

13. The invention of claim 8 wherein each of said plurality of light sources is an LED.

14. The invention of claim 13 wherein said base wall has an upper surface; and wherein each of said plurality of address decoders is secured to said upper surface.

15. The invention of claim 8 wherein said container includes a cover.

16. The invention of claim 15 wherein said cover is transparent.

17. The invention of claim 8 wherein said cover is attached to one of said upstanding wall members.

18. The invention of claim 8 wherein each of said compartment storage containers further includes first and second electrically conductive handles each secured to a different one of said upstanding wall members and electrically coupled to said plurality of address decoders so that compartment search signals coupled to at least one of said handles are supplied to said plurality of address decoders.

19. A compartment storage container for enabling remote location and retrieval of objects located in the container, said container comprising:

a base wall;

a plurality of upstanding wall members connected to said base wall, said base wall and said plurality of upstanding wall members defining an enclosure volume;

a plurality of upstanding partition members located within said enclosure volume and defining a plurality of compartments for receiving objects;

a plurality of address decoders each positioned in a different one of said plurality of compartments and each having a unique address;

an electrical input connector secured to one of said upstanding wall members and ohmically coupled to said plurality of address decoders for providing compartment search signals supplied by a source to said plurality of address decoders;

a plurality of light sources each electrically coupled to a different one of said plurality of address decoders and activatable thereby whenever one of said compartment search signals specifies an address matching the address of the associated one of said plurality of address decoders; and first and second electrically conductive handles each secured to a different one of said upstanding wall members and electrically coupled to said plurality of address decoders so that compartment search signals coupled to at least one of said handles are supplied to said plurality of address decoders.

* * * * *

UNITED STATES PATENT AND TRADEMARK OFFICE
CERTIFICATE OF CORRECTION

PATENT NO.       : 9,087,316 B2                                          Page 1 of 1
APPLICATION NO.  : 13/815106
DATED            : July 21, 2015
INVENTOR(S)      : Zhu et al.

It is certified that error appears in the above-identified patent and that said Letters Patent is hereby corrected as shown below:

On the title page, item (73) Assignee change "Microdata Corporation" to–iMicrodata Corporation Signed and Sealed this
Fifteenth Day of September, 2015

Michelle K. Lee
*Director of the United States Patent and Trademark Office*